(12) United States Patent
Carne

(10) Patent No.: US 7,287,444 B2
(45) Date of Patent: Oct. 30, 2007

(54) TRANSMISSION PRESSURE MODULATION BY ORIFICED CHECK VALVE

(75) Inventor: Gary S. Carne, Riverton, UT (US)

(73) Assignee: Electronic Systems Eliminator, Inc.

( * ) Notice: Subject to any disclaimer, the term of this patent is extended or adjusted under 35 U.S.C. 154(b) by 219 days.

(21) Appl. No.: 11/141,994

(22) Filed: May 31, 2005

(65) Prior Publication Data

US 2005/0272549 A1    Dec. 8, 2005

Related U.S. Application Data

(60) Provisional application No. 60/576,254, filed on Jun. 1, 2004.

(51) Int. Cl.
*F16H 57/02* (2006.01)
*F16H 57/04* (2006.01)
*F16K 17/00* (2006.01)

(52) U.S. Cl. .................... 74/606 R; 477/906; 477/907; 137/456; 137/459

(58) Field of Classification Search ............... 74/606 R; 251/129.01, 129.15, 56, 58; 477/906, 907; 137/51, 455, 901; 701/51, 58
See application file for complete search history.

(56) References Cited

U.S. PATENT DOCUMENTS

| | | |
|---|---|---|
| 3,999,450 A | 12/1976 | Miyauchi et al. |
| 4,033,201 A | 7/1977 | Sakai |
| 4,034,628 A | 7/1977 | Sakai et al. |
| 4,049,101 A | 9/1977 | Hattori et al. |
| 4,050,332 A | 9/1977 | Taga |
| 4,065,985 A | 1/1978 | Taga |
| 4,095,486 A | 6/1978 | Ohnuma |
| 4,106,369 A | 8/1978 | Taga |
| 4,125,038 A | 11/1978 | Hiramatsu |
| 4,129,051 A | 12/1978 | Shindo et al. |
| 4,136,584 A | 1/1979 | Ishikawa |
| 4,138,846 A | 2/1979 | Sakakibara |
| 4,181,204 A | 1/1980 | Ito |
| 4,226,200 A | 10/1980 | Morisawa et al. |
| 4,289,048 A | 9/1981 | Mikel et al. |
| 4,290,324 A | 9/1981 | Aubert et al. |
| RE31,023 E | 9/1982 | Hall, III |
| 4,367,528 A | 1/1983 | Kawamoto et al. |
| 4,368,650 A | 1/1983 | Numazawa et al. |
| 4,369,865 A | 1/1983 | Sunohara et al. |
| 4,388,845 A | 6/1983 | Kishi et al. |
| 4,403,919 A | 9/1983 | Stanton et al. |
| 4,408,462 A | 10/1983 | Sakakibara et al. |

(Continued)

OTHER PUBLICATIONS

Carne, "Pressure-control system for E40D/4R100 units can help prevent comebacks", Dec. 2004, URL: http://www.freewaytransmissions.com/transmissiondigest.htm.

(Continued)

*Primary Examiner*—Tisha Lewis
(74) *Attorney, Agent, or Firm*—Everett D. Robinson; Echelon IP, LLC

(57) ABSTRACT

Disclosed herein are systems and methods of controlling the pressure in a modulation pressure circuit through transmission fluid through an orificed check valve supplementary or in substitution of a computer-controlled pressure regulation solenoid. Detailed information on various example embodiments of the inventions are provided in the Detailed Description below, and the inventions are defined by the appended claims.

15 Claims, 7 Drawing Sheets

U.S. PATENT DOCUMENTS

| | | | |
|---|---|---|---|
| 4,417,307 A | 11/1983 | Kubo et al. | |
| 4,458,318 A | 7/1984 | Smit et al. | |
| 4,465,167 A | 8/1984 | Fujioka | |
| 4,476,747 A | 10/1984 | Kawamoto | |
| 4,480,505 A | 11/1984 | Takano et al. | |
| 4,481,877 A | 11/1984 | Takano et al. | |
| 4,494,640 A | 1/1985 | Honig | |
| 4,529,070 A | 7/1985 | Kobayashi | |
| 4,541,927 A | 9/1985 | Breidenbaugh | |
| 4,552,036 A | 11/1985 | Takano et al. | |
| 4,660,693 A | 4/1987 | Taga et al. | |
| 4,663,992 A | 5/1987 | Fujiura et al. | |
| 4,669,336 A | 6/1987 | Okada et al. | |
| 4,682,519 A | 7/1987 | Okada et al. | |
| 4,691,594 A | 9/1987 | Taga et al. | |
| 4,719,822 A | 1/1988 | Morisawa | |
| 4,829,853 A | 5/1989 | Sakaguchi | |
| 4,856,381 A | 8/1989 | Funahashi et al. | |
| 4,856,628 A | 8/1989 | Momiyama | |
| 4,857,034 A * | 8/1989 | Kouno et al. | 474/28 |
| 4,889,016 A | 12/1989 | Kuwayama et al. | |
| 4,903,550 A | 2/1990 | Kuwayama et al. | |
| 4,909,345 A | 3/1990 | Iwatsuki et al. | |
| 4,942,782 A | 7/1990 | Kuwayama et al. | |
| 4,974,696 A | 12/1990 | Miyajima et al. | |
| 4,982,622 A | 1/1991 | Yamamoto et al. | |
| 4,998,437 A | 3/1991 | Magoolaghan | |
| 5,024,459 A | 6/1991 | Kokubo et al. | |
| 5,042,328 A | 8/1991 | Morishige et al. | |
| 5,063,815 A | 11/1991 | Oshidari | |
| 5,074,168 A | 12/1991 | Ishikawa et al. | |
| 5,078,028 A | 1/1992 | Ishikawa et al. | |
| 5,079,973 A | 1/1992 | Ookubo et al. | |
| 5,082,096 A | 1/1992 | Yamashita et al. | |
| 5,083,481 A * | 1/1992 | Smith et al. | 477/162 |
| 5,085,103 A | 2/1992 | Ando et al. | |
| 5,085,107 A | 2/1992 | Tatara | |
| 5,088,353 A | 2/1992 | Yoshida | |
| 5,089,964 A | 2/1992 | Morishige et al. | |
| 5,115,696 A | 5/1992 | Takada et al. | |
| 5,157,608 A | 10/1992 | Sankpal et al. | |
| 5,191,953 A | 3/1993 | Ito et al. | |
| 5,291,804 A | 3/1994 | Kashihara et al. | |
| 5,297,044 A | 3/1994 | Sakaki et al. | |
| 5,303,614 A | 4/1994 | Sakaki et al. | |
| 5,305,663 A | 4/1994 | Leonard et al. | |
| 5,319,559 A | 6/1994 | Kusaka et al. | |
| 5,341,703 A | 8/1994 | Palansky et al. | |
| 5,342,253 A | 8/1994 | Mizobe et al. | |
| 5,365,445 A | 11/1994 | Takizawa | |
| 5,409,427 A | 4/1995 | Mori et al. | |
| 5,413,539 A | 5/1995 | Leonard et al. | |
| 5,415,603 A | 5/1995 | Tuzuki et al. | |
| 5,415,606 A | 5/1995 | Kovalsky et al. | |
| 5,458,545 A | 10/1995 | Adam et al. | |
| 5,460,582 A | 10/1995 | Palansky et al. | |
| 5,468,198 A | 11/1995 | Holbrook et al. | |
| 5,472,062 A | 12/1995 | Nagai et al. | |
| 5,507,700 A | 4/1996 | Niiyama | |
| 5,553,694 A | 9/1996 | Schulz et al. | |
| 5,573,476 A | 11/1996 | Minowa et al. | |
| 5,573,478 A | 11/1996 | Tsukamoto et al. | |
| 5,642,283 A | 6/1997 | Schulz et al. | |
| 5,644,916 A | 7/1997 | Hayasaki | |
| 5,665,023 A | 9/1997 | Aoki et al. | |
| 5,695,032 A * | 12/1997 | Murata et al. | 192/48.1 |
| 5,720,691 A | 2/1998 | Ogawa et al. | |
| 5,720,694 A | 2/1998 | Jang | |
| 5,722,519 A | 3/1998 | Kirchhoffer et al. | |
| 5,730,685 A | 3/1998 | Younger | |
| 5,741,004 A | 4/1998 | Lee | |
| 5,759,134 A | 6/1998 | Kuriyama | |
| 5,768,953 A | 6/1998 | Younger | |
| 5,816,974 A | 10/1998 | Jang | |
| 5,820,507 A | 10/1998 | Younger | |
| 5,826,208 A | 10/1998 | Kuroiwa et al. | |
| 6,077,187 A | 6/2000 | Suzuki et al. | |
| 6,122,583 A | 9/2000 | Kirchhoffer et al. | |
| 6,190,286 B1 | 2/2001 | Ito et al. | |
| 6,278,925 B1 | 8/2001 | Wozniak | |
| 6,439,923 B1 | 8/2002 | Kirkendall et al. | |
| 6,464,610 B1 | 10/2002 | Hisano et al. | |
| 6,478,050 B2 | 11/2002 | Park et al. | |
| 6,497,096 B1 | 12/2002 | Joo | |
| 6,679,133 B1 | 1/2004 | Kayano et al. | |
| 6,733,417 B2 | 5/2004 | Ajimoto | |
| 6,754,574 B2 | 6/2004 | Tokura et al. | |
| 6,755,766 B2 | 6/2004 | Inoue et al. | |
| 6,780,131 B2 | 8/2004 | Itou et al. | |
| 6,805,026 B2 | 10/2004 | Hori et al. | |
| 6,805,647 B2 | 10/2004 | Silveri et al. | |
| 6,826,908 B1 | 12/2004 | Stafford | |
| 6,835,152 B2 | 12/2004 | Itou et al. | |
| 6,860,104 B2 | 3/2005 | Reinertsen | |
| 6,878,086 B2 | 4/2005 | Sugiura et al. | |
| 6,950,734 B2 * | 9/2005 | Zimmermann et al. | 701/54 |
| 2001/0036878 A1 | 11/2001 | Itou et al. | |
| 2001/0056005 A1 | 12/2001 | Kim et al. | |
| 2002/0083986 A1 | 7/2002 | Park et al. | |
| 2003/0022749 A1 | 1/2003 | Itou et al. | |
| 2003/0074894 A1 | 4/2003 | Reinertsen | |
| 2004/0116249 A1 | 6/2004 | Kayano et al. | |
| 2005/0076962 A1 | 4/2005 | Wade | |

OTHER PUBLICATIONS

Baker, "Why Add a TransCommand", Apr. 20, 2005, URL: http://www.fuelinjection.net/newsletter/trans_cmd.html.

"1993 Ford Econoline E250 Description & Operation", 2003, MRIC LLC and Snap-On Tools. Co. LLC.

"E40D", 1999, Automatic Transmission Service Group.

* cited by examiner

TRANSMISSION PRESSURE MODULATION BY ORIFICED CHECK VALVE

CROSS REFERENCE TO RELATED APPLICATIONS

This Application claims the benefit of the U.S. Provisional Application Ser. No. 60/576,254 filed Jun. 1, 2004, which is hereby incorporated by reference in its entirety.

BACKGROUND

The claimed inventions relate generally to systems that control line pressure in an automatic transmission by a modulation pressure, and more particularly to transmission modification kits that provide line pressure control as a substitute or supplement for computer-controlled line pressure through a modulation pressure circuit and solenoid.

For orientation, the operation of automatic transmissions will now be described. Shown in FIG. 1 are conceptual elements of operation of most automatic transmissions. A pump 1 is configured to receive fluid, typically oil, from a reservoir or pan 4 passing through a filter 3. Pump 1 is driven by rotation of an input shaft coupled to an engine, not shown. In most transmissions a positive displacement pump is used, which is a pump that generates a substantially constant volume per input shaft rotation, or a fluid flow substantially proportional to the rotation of the input shaft. Examples of positive displacement pumps are georotor, gear and vane type pumps. While the input shaft is being driven by rotation of the engine, pump 1 produces a flow of fluid that returns to the reservoir 4 except for a small portion needed for lubrication and to displace valves and servos. Fluid pressure is produced by a main regulator 2 by partially blocking the flow produced by pump 1, which "line" pressure is distributed throughout the transmission through passages 5.

The line pressure is typically provided at a pressure higher than needed by the operating transmission components, and is regulated down to lower operating pressures by auxiliary regulators 6a and 6b. Those lower pressures are provided to the transmission components, in this example valves 7a and 7b and servos 8a and 8b. The arrangement shown in FIG. 1 is merely conceptual; in practice many different configurations of regulators, valves and servos are be used, as is understood by one of ordinary skill in the art.

Fluid pressure may be applied to the several servos in the transmission to provide mechanical operation of the driven components. Those components ordinarily include several clutches and a torque converter, by which the several gears of the transmission are applied to the engine output. An accumulator is normally coupled to the input of a servo, which slows the engagement or disengagement of the servo. Although an accumulator might be implemented by a spring and piston in a bore, conceptually one operates as a balloon. If pressure is increased, an accumulator accepts fluid until an equalibrium is reached. Likewise, as pressure decreases, the accumulator discharges fluid to the new set pressure. The movement of fluid in or out of an accumulator is not instantaneous, but rather is slowed by the fluid passages of the transmission. An accumulator thereby functions to buffer input pressures and graduate the transitions of servo engagement and disengagement.

The gradual operation of servos tends to soften the shifts of the transmission. Sudden gear transitions are undesirable, because passengers feel a lurch or impact and because undue stress is applied to the engine and drive components. Gear shifts that are too soft, however, are also undesirable. During the transition from one gear to another, two clutches may be engaged for a time which increases wear and heat in the transmission. Soft shifts increase this transition time, which decreases the service life of the transmission. A great deal of research and design effort has been made to optimize the shifts in transmissions to balance this tradeoff.

It has been recognized that firm shifts are preferable in some driving circumstances, such as during hard acceleration. Soft shifts, on the other hand, are preferable under other circumstances, for example under light acceleration and coasting. One method of acheiving both hard and soft shifts in the same transmission is to vary the pressure applied to the servos and accumulators. A lower engagement pressure to a servo results in an increased transition time, as more time is required to "fill up" the accumulator. Likewise, a higher disengagement pressure may also be helpful to soften a shift.

One technique used to adjust fluid pressure to servos is through controlling line pressure. A higher line pressure will cause faster servo transition, at least to engagement. As a servo is to be engaged, its accumulator must first accommodate the new pressure. It does so by accepting an amount of fluid which the system must supply through the line pressure. This flow must pass through the various restrictions in the transmission passages, and can do so more rapidly if the head pressure is higher. Thus a higher line pressure will force a greater fluid flow through the transmission passages, which accordingly causes more rapid accumulator adjustment and firmer shifts. This technique also applies to the movement of valves, which also requires some amount of fluid to enter a chamber at the end of the valve bore.

Modulators capable of adjusting fluid pressure have included throttle valves with mechanical linkage and vacuum modulators. These have worked to increase transmission fluid pressure when the throttle is open, intending to cause firmer shifts under that condition. Most recently, modulators have been coupled to an automotive computer/controller that controls the transmission line pressure. Modem automobiles feed a number of sensor inputs into a computer, which then operates to control any number of operational parameters, such as the timing of fuel injectors and spark plug ignition timing. The computer is carefully designed to provide good performance, especially under average driving conditions.

Referring now to FIG. 2A, a line pressure modulation system is shown capable of being controlled by an automotive computer. As in the system of FIG. 1, a pump draws fluid through a filter 3 and supplies fluid flow to a main regulator 5, which provides regulated line pressure 5. Main regulator 2 includes a modulation port by which the line pressure may be controlled, for example, in a modulation circuit at a pressure proportional to the modulation pressure in a given operating range. Restrictions 14 and 15 provide pressure isolation between the modulation port and the input port of the main regulator 2. Restrictions 11 and 12 are conceptual in nature; in practice these restrictions might be provided by passages in the transmission, by regulators, or by other components that supply isolation between the two circuits. A solenoid or modulator 9 is coupled to the modulation pressure 13 providing relief whereby the modulation pressure may be controlled or regulated. A pressure relief valve 10 including a fluid exhaust port is provided to vent a damagingly high modulation pressure 13, which may also limit the maximum line pressure 5 that can be developed in the system. When solenoid 9 in the example is inactive, no fluid flow occurs through the modulation passages under normal conditions. Solenoid 9 may be fully driven to acheive a low modulation pressure 13, or may be partially driven to acheive a moderate modulation pressures through pulse-width modulation techniques, for example by an automotive computer.

The configuration shown in FIG. 2 has two inherent failure conditions. First, if the solenoid should become disconnected from the computer, or if the solenoid became stuck "off," the modulation pressure will rise to its maximum. This failure will result in hard shifts at all times, and may result in damage to transmission components, such as the pump, if line pressure is excessive. In some transmissions cooler and lubrication flow may be reduced or shut-off with excessive modulation pressure, as will be discussed below. Second, if the solenoid should become stuck "on", the modulation pressure will stay low, resulting in soft slippery shifts at all times. This may cause overheating and failure of the transmission, especially for vehicles towing loads up grades.

That configuration has a third failure mode, which is failure of the computer to appropriately command line pressure. The designer of the system may have considered only limited circumstances of use, and designed the computer's program for only the "normal" operational use. For example, it is not uncommon for a single transmission model to be installed to both standard passenger and towing vehicles, despite the large potential difference in total weight. The transmission design may be optimized for a passenger car or a medium duty truck, and may be found to perform acceptably well in the heavy-duty towing vehicle such that an additional transmission model is not necessary to develop or maintain an assembly line for. Under actual use that transmission might be subjected to heavier loads than what the designer intended, because, for example, an operator finds the vehicle engine is sufficiently powered to tow a load up a certain grade. The vehicle's computer may not have a sensory input for the tow weight, and may command soft shifts where firm shifts are called for to avoid transmission overheating. Additionally, most automotive companies do not provide for any automotive computer reprogramming as a solution.

A fourth failure mode may be encountered with the failure of an engine or transmission sensor. It is not unknown for vehicle owners or drivers to continue to operate a vehicle even though the check-engine light is on, indicating that an automotive computer has discovered a problem and recorded a trouble code. Indeed, a vehicle operator may be unmotivated to have the vehicle diagnosed and repaired, due to an expected high cost. Furthermore, some older vehicles were designed only to check for electrical continuity of sensors, and not to detect and flag out-of-range conditions caused by failing sensors. A failed sensor may cause incorrect control of a transmission. For example, a faulty throttle position sensor may cause an automotive computer to erroneously recognize a full-throttle condition as a mid or low-throttle condition. The computer might then command low line pressure for softer shifts, increasing heat and wear. Many other undesirable effects may occur from the failure of other vehicle sensors.

Automotive systems, and especially transmission systems, are operationally complex and require a great deal of knowledge and experience to diagnose and repair problems not frequently encountered. Problems with line pressure are not always perceptible with a vehicle "in the shop," particularly if those problems occur only under special circumstances, for example towing a heavy load up a long and steep grade. Furthermore, it is uncommon for a mechanic or driver to observe transmission line pressure out of the shop because of the difficulty installing a gauge that can be seen from the safety of the inside of a moving vehicle, which might be the only way to directly observe certain transmission performance problems. Trained but inexperienced mechanics may follow the standard flowcharts and/or instructions and observe proper performance under normal conditions, but fail to understand the nature of a particular transmission failure. Furthermore, there has been deficit of understanding of the operational relationship between an automotive computer and a transmission in recent automobiles, which has allowed many transmission problems to continue without a solution for several years. Indeed, there has been a need for a way to provide reliable modulation pressure in a transmission independently of an automotive computer for some time.

BRIEF SUMMARY

Disclosed herein are systems and methods of controlling the pressure in a modulation pressure circuit through transmission fluid through an orificed check valve supplementary or in substitution of a computer-controlled pressure regulation solenoid. Detailed information on various example embodiments of the inventions are provided in the Detailed Description below, and the inventions are defined by the appended claims.

Reference will now be made in detail to orificed check valves, kits for modifying a transmission to control line pressure and methods of using the same, which may include some more specific embodiments of the claimed inventions, examples of which are illustrated in the accompanying drawings.

DETAILED DESCRIPTION

Figure 3A:
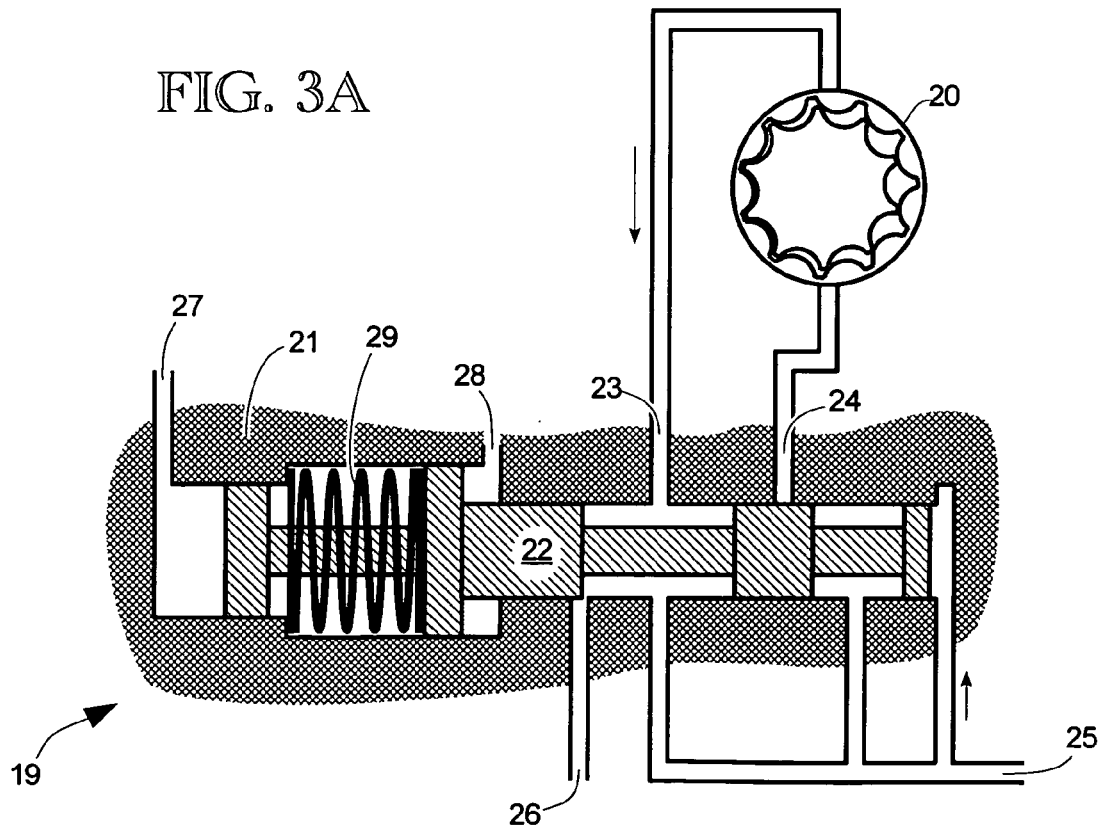
FIGS. 3A, 3B and 3C conceptually shows the operation and failure modes of a main regulator valve that controls line pressure through a modulation port.

Disclosed herein is a modification procedure for a Ford E40D or 4R100 type transmission. This design will now be discussed, by which advantages of modifications later described will become apparent. Referring first to FIG. 3A, elements of the Main Regulator Valve 19 in the E40D/4R100 are conceptually illustrated in simple detail. Valve 19 includes a valve body 21 machined to receive a spool valve 22 and compression spring 29. Valve body 21 includes several ports, including a pump inlet 23 and a line pressure outlet 25. In this figure valve 19 is shown in a dry or startup state, with minimal or no line pressure. Also in this figure, no modulation pressure is yet being applied to modulation port 27. An exhaust port 24 is provided to dump fluid to the pan in excess of that needed to regulate line pressure, which in this figure is closed pending pressure buildup. An open passage 28 vents pressure or vacuum as spool valve 22 moves in its chamber. Finally, a lubrication/cooling port 26 is provided to supply fluid to certain components or areas of the transmission under normal operating conditions.

Figure 3B:
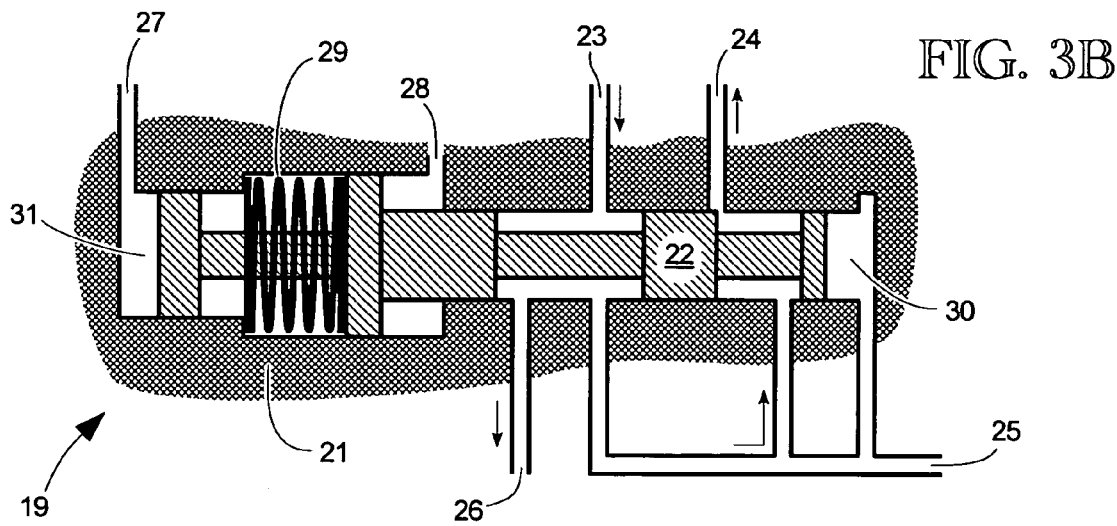

Referring now to FIG. 3B, as line pressure builds, pressure in chamber 30 compresses spring 29 and forces spool valve 22 to move to the left. At the position shown in the figure, exhaust port 24 opens, which causes a circuit of fluid through the pump, inlet 23, exhaust port 24 and pan. Lubrication/cooling port 26 also becomes unobstructed and provides lubrication. Modulation pressure may be provided at chamber 31, which presses the valve to move to the right. Spool valve 22 then reaches a new position in equalibrium slightly to the right with higher pressures at both chamber 30 and line pressure outlet 25.

Figure 3C:
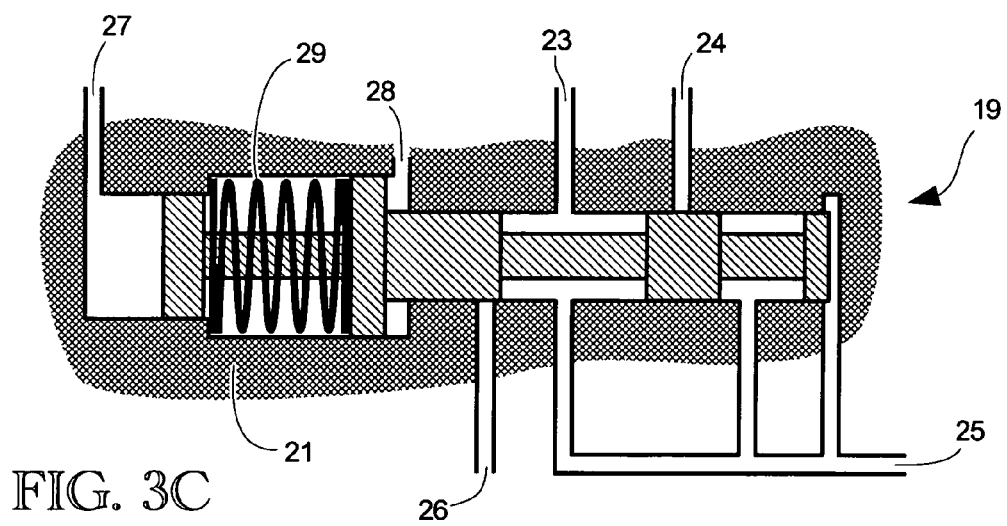

Shown in FIG. 3C is valve 19 in a position of failure caused by excess modulation pressure. As shown spool valve 22 is positioned so far to the right as to close off exhaust port 24. In this state, line pressure will rise excessively high, especially at higher engine RPMs. In the example of FIG. 3C, lubrication/cooling port 26 is closed off, and little or no oil is supplied to the bearings, bushings and planetaries which are in danger of failure. This condition might be encountered in a vehicle towing a heavy load, with the throttle open fully accelerating from a stop or pulling the load up a steep grade, causing line pressures exceeding about 170 to 200 psi. This condition might also be encountered if a pressure-relieving solenoid valve is disconnected or stuck off. If this condition is continued for more than a few seconds, overheating or failure of the bearing surfaces may result in the total failure of the transmission.

Figure 1:
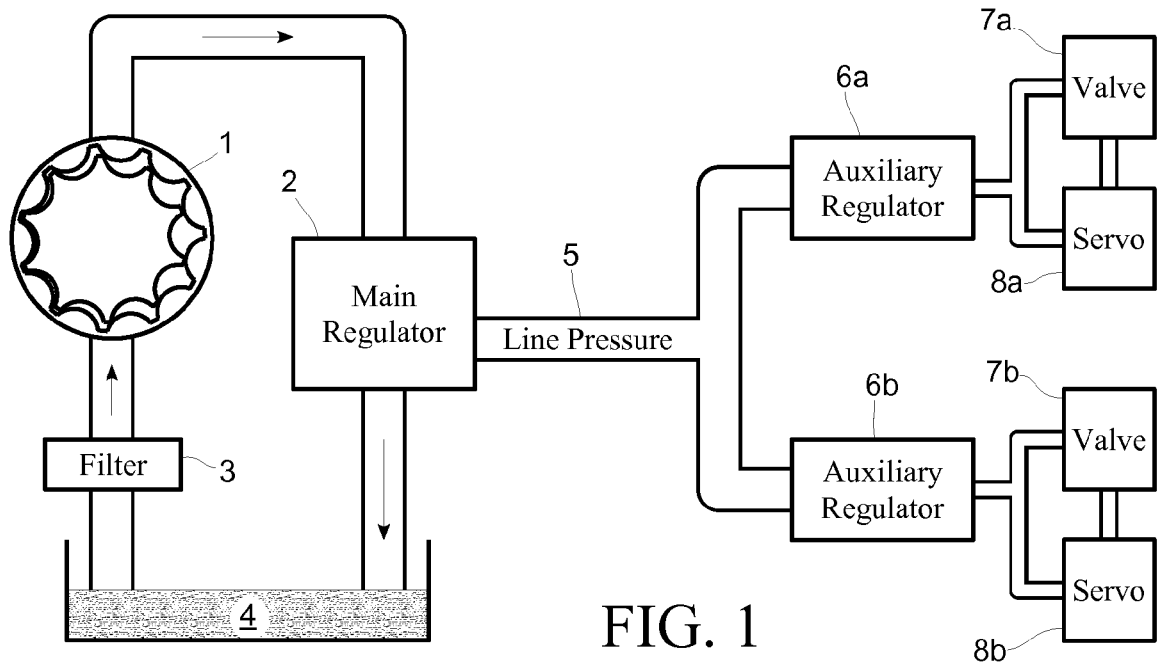
FIG. 1 shows conceptual elements of most automatic transmissions.
Figure 2A:
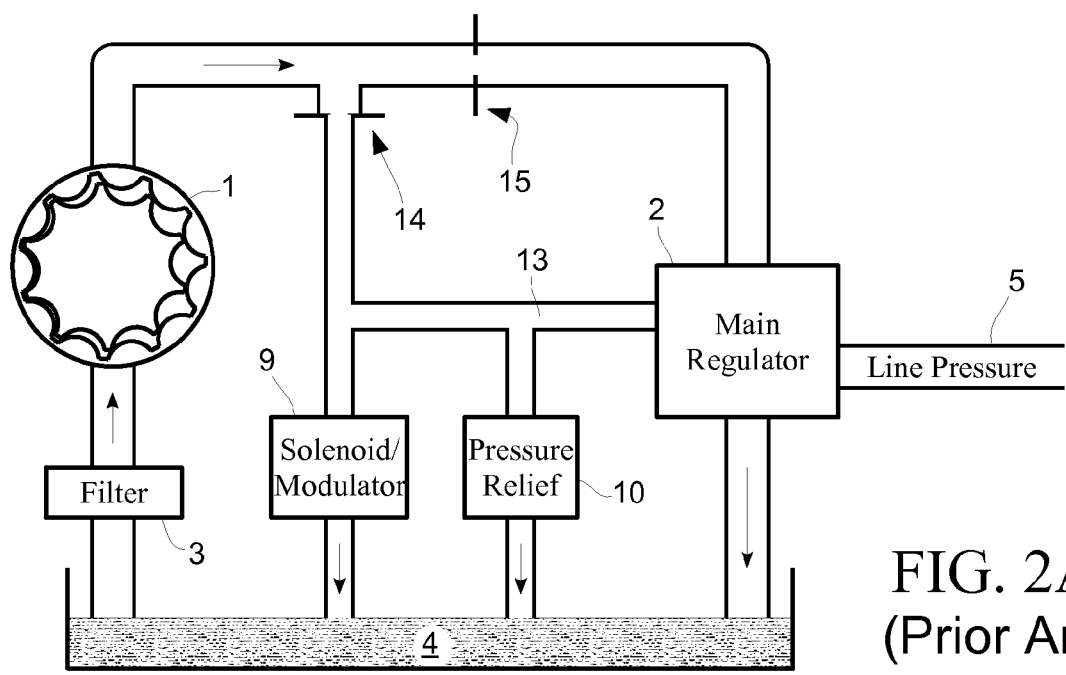
FIG. 2A conceptually shows a line pressure modulation system controllable by an automotive computer.
Figure 2B:
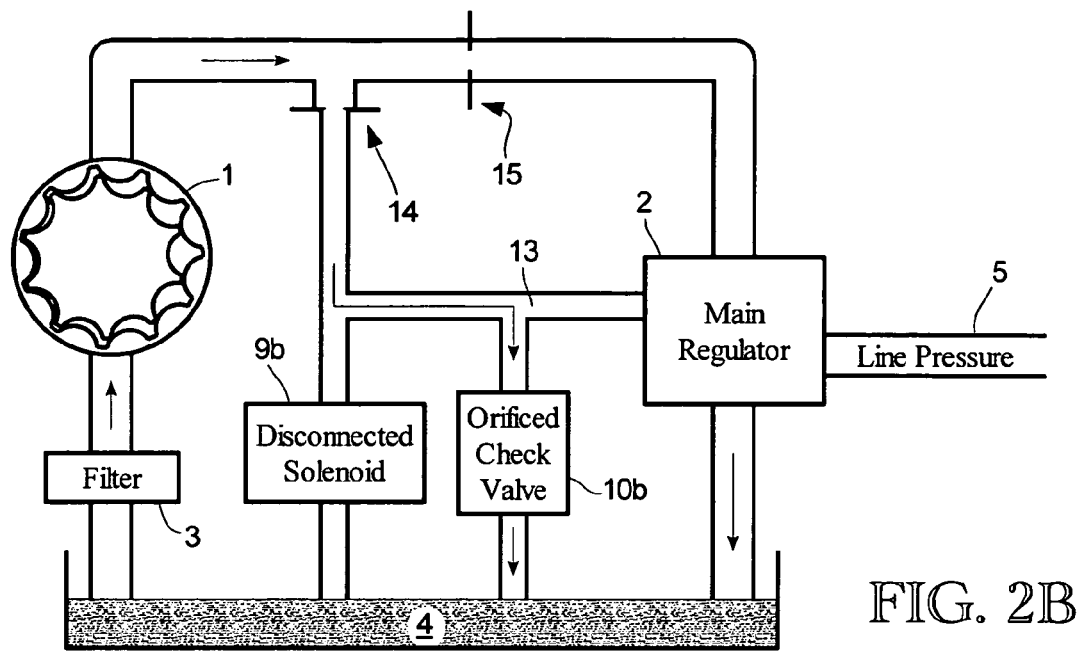
FIG. 2B conceptually shows a line pressure modulation system to that of FIG. 2A with an orificed check valve and with the solenoid made inactive.
Figure 4:
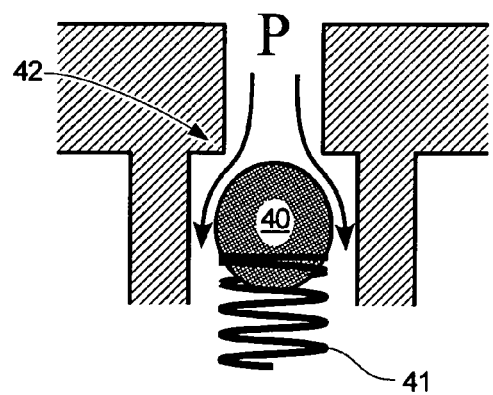
FIG. 4 illustrates a pressure-relief check ball.
Figure 5A:
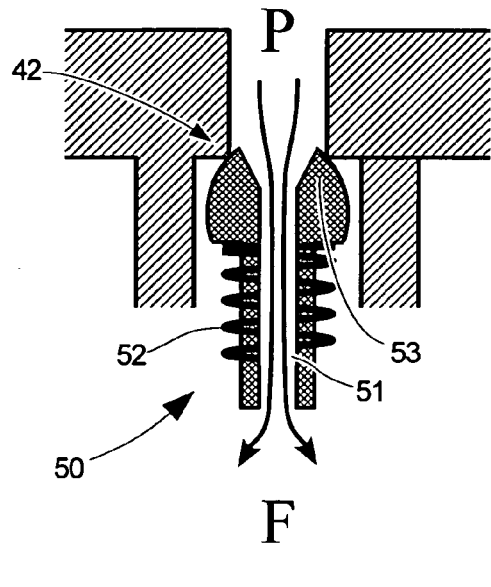
FIGS. 5A and 5B show the operation of an orificed check valve.

Referring back now to FIG. 2A, a pressure relief valve 10 may be incorporated in the modulation pressure circuit preventing a cascading transmission failure. In the E40D/4R100 transmission this is implemented with a check ball 40, as shown in FIG. 4. Check ball 40 is maintained against seat 42 by compression spring 41 under normal pressure. When pressure P exceeds a limit, the force supplied by spring 41 is overcome and fluid escapes around ball 40 in the direction shown by the arrows. That check ball can be replaced by an orificed check valve 50, as shown in seated position in FIG. 5A.

Figure 5B:
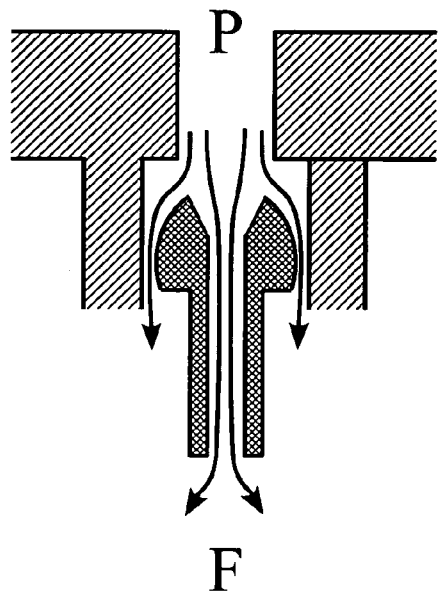

With valve 50 seated, pressure P produces a flow F through passage or orifice 51, which flow is returned to the transmission reservoir or pan. Valve 50 includes a spring fitting for receiving compression spring 52. Valve 50 is pressed against seat 42 so long as the force supplied by compression spring 52 is greater than the force of pressure against valve head seating portion 53. Valve 50 also acts as a pressure relief valve, in that excess pressure P will cause fluid to flow around valve head 53 as shown in FIG. 5B.

Figure 6:
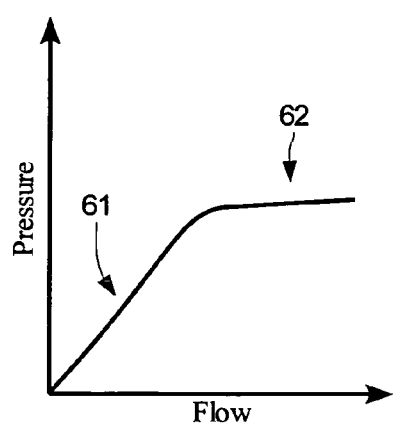
FIG. 6 shows a relationship between pressure and transmission fluid flow through a modulation pressure circuit achievable through the use of an orificed check valve.

FIG. 6 depicts the resulting flow F to pressure P relationship of an orificed check valve system. With large flow generally above a threshold value, the pressure is limited as shown on the curve at 62. At a smaller range of flows 61, pressure P has a linear relationship with flow. If unregulated flow is supplied by a positive displacement pump, such as a georotor or vane pump, pressure P has a linear relationship with input shaft rotation. The higher modulation pressures P produced by higher engine rotation translates into higher line pressures and firmer shifts. The slope of the curve at 61 depends on the size of the orifice and the flow entering the modulation pressure circuit. A proper orifice size may be determined by installing to a test transmission and observing the line pressure at a line pressure tap at various engine RPMs.

Provided that downshift timing is provided by factors other than only engine or input shaft rotation, such as a throttle valve, vacuum modulator or computer algorithm, the result will generally be soft shifts under light throttle and firm shifts under acceleration, due to the operation of the transmission system to hold out downshifts to higher engine RPMs under increased throttle. Indeed, in a modification procedure described below, computer control of line pressure is eliminated entirely in favor of the linear pressure to flow relationship provided by the orificed check valve, which removes any variation introduced by the computer that might be incorrect for a towed load. If the modulation pressure is provided through a regulator in a particular transmission design, an orificed check valve or other component may still provide a flow to pressure relationship if the regulator is restricted or disabled.

Figure 7A:
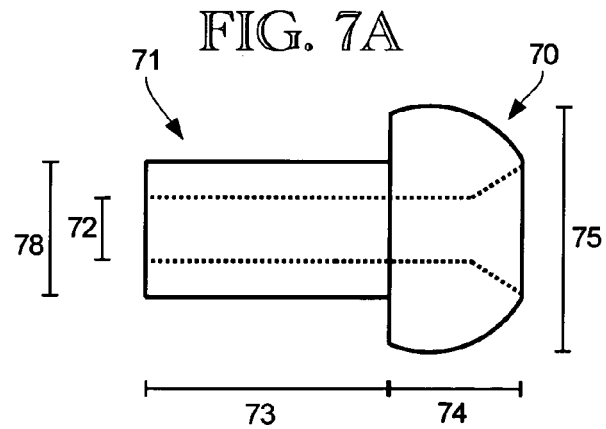
FIGS. 7A and 7B show an exemplary orificed check valve suitable for a Ford E40D/4R100 transmission.
Figure 7B:
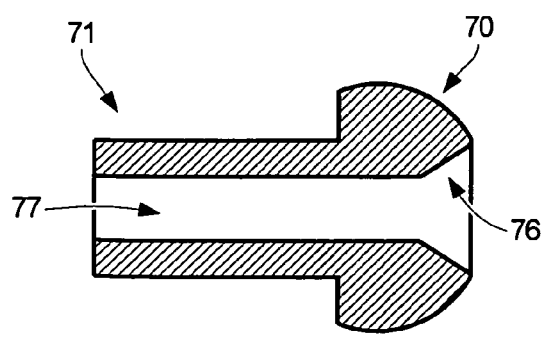

FIG. 7A shows an enlarged side view of a dimensioned orificed check valve suitable for installation to an EPC blowoff exhaust port on a Ford E40D/4R100 transmission, replacing the standard 0.25 inch check ball. FIG. 7B shows a corresponding sectional view. The valve has a mushroom-like shape, including a near half-spherical seating portion 70 having a similar curvature to that of the check ball it will replace and a shaft portion 71 including a spring fitting. The curvature may be varied provided that a seal is maintained providing a linear flow to pressure relationship throughout an operational flow range. The half-spherical portion has a diameter 75 of 0.31 inch, with a total length 74 of 0.21 inch, and is shaped to seat against the EPC exhaust port. The shaft portion 71 is cylindrical dimensioned at a diameter 78 of 0.17 inch and 0.315 inch in length 73. Those shaft dimensions are suitable to accept the original factory check ball compression spring, and may be varied to suit other springs or positioning devices as desired. An orifice 77 passes through spherical portion 70 and shaft portion 71, having an inside diameter chosen with the desired pressure to flow ratio described above. For the Ford E40D/4R100 transmissions, good results may be obtained by selecting a diameter between about 0.073 inches (for heavy-duty towing vehicles) to 0.091 inches (light duty passenger vehicles.) These particular orificed check valves can be conveniently fashioned from modulated release cartridges for A4LD type transmissions, or can be machined from any durable metal. Finally, a taper 76 at the orifice inlet may be formed to enhance fluid flow.

In addition to the installation of the orificed check valve, other modifications can be made. First, any modulator in the modulation pressure circuit may be deactivated, disconnected or replaced with a dummy insert. Optionally, a substitutionary component for any modulator may be used to present a device of similar characteristics to a present automotive computer. For the Ford E40D/4R100 transmission, this may be accomplished by disconnecting the EPC solenoid from the powertrain control module (PCM) and by substituting an electrically resistive load with a similar resistance to an EPC solenoid, so as to avoid setting any trouble codes in operation. Other transmission designs may indicate other deactivations or disconnections. If the modulation pressure circuit is designed to be regulated, the regulator may be modified to produce a flow sourced to the circuit, advantageously rising with greater input shaft rotation. It may also be desired to replace compression springs and other force-providing components to adjust the accumulators and valves operation for any changes to line pressure.

EXEMPLARY MODIFICATION KIT

Figure 8:
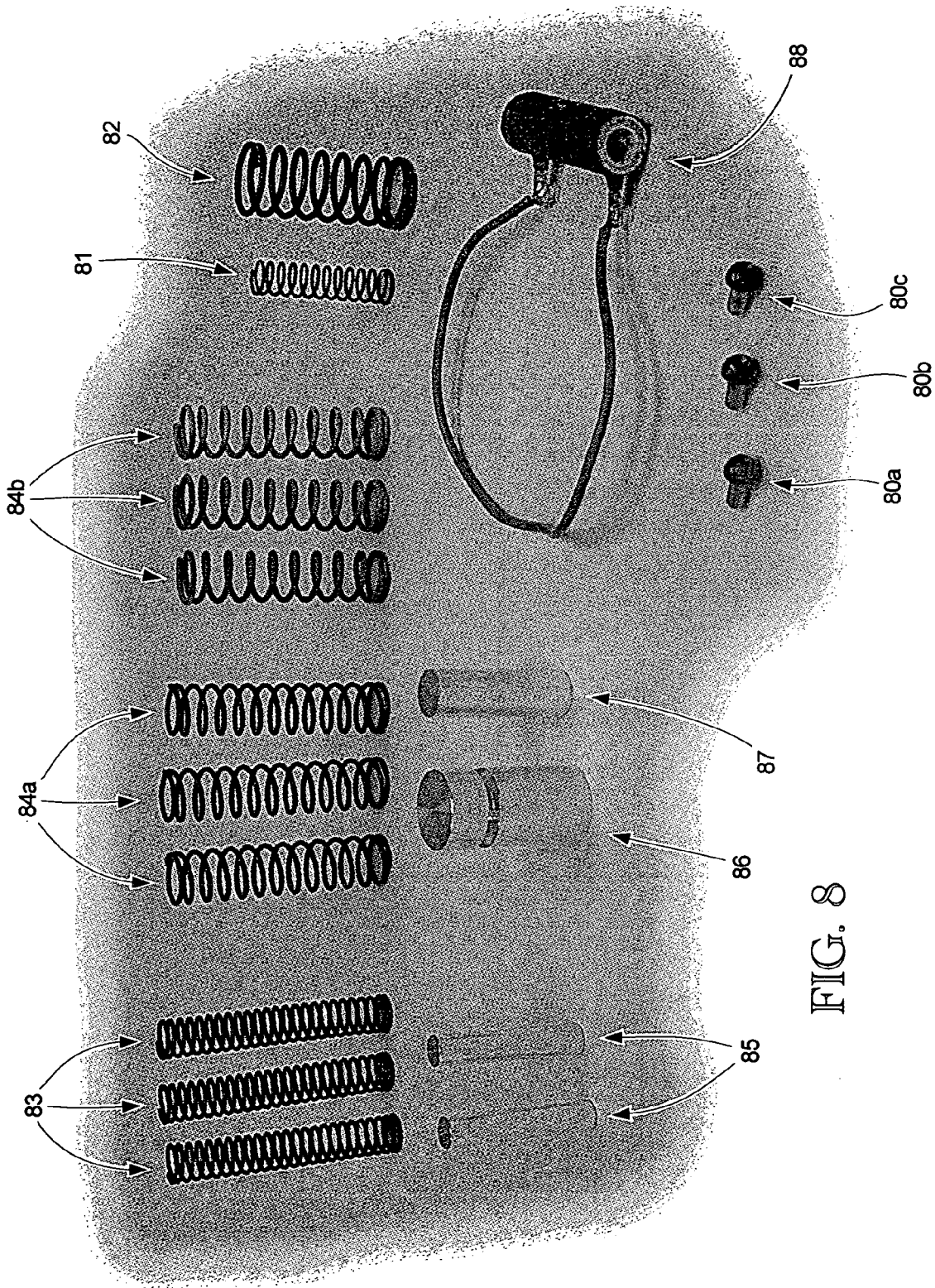
FIG. 8 shows a modification kit for a Ford E40D/4R100 transmission.
Figure 9:
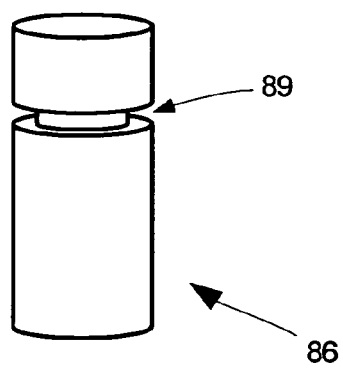
FIG. 9 depicts the PCS plug included in the kit of FIG. 8.
Figure 11:
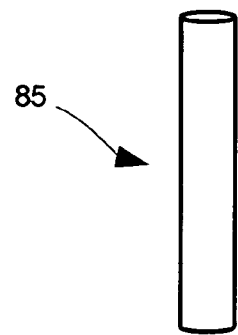
FIG. 11 depicts an AP stop included in the kit of FIG. 8.
Figure 10:
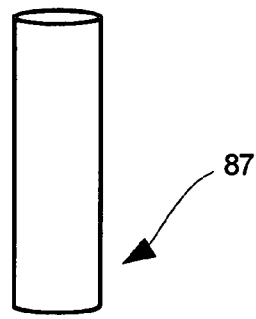
FIG. 10 depicts the PMV plug included in the kit of FIG. 8.

Depicted in FIG. 8 is an exemplary modification kit for conversion of a Ford E40D/4R100 transmission to orificed check valve operation. That kit includes three orificed check valves 80a, 80b and 80c of the design described for FIGS. 7A and 7B, having three different orifice diameters, for example 0.094 (normal driving) 0.065 (towing) and 0.101 (smooth shifting) inches. Inner and outer springs 81 and 82 are provided as substitutes to adjust the performance of the main pressure regulating valve, or merely as replacements as part of good maintenance practices. Replacement accumulator springs are also provided (three sets for the three accumulators), which installed in each accumulator include an inner spring 83 and an outer spring 84a or 84b. These accumulator springs are adapted or tuned to the line pressures produced by the other components of the kit. The exemplary kit includes outer springs for two variants of the E40D/4R100 transmissions, the first of which was manufactured from 1989-94 and the second from 1995 on. The kit also includes one PCS plug 86, one PMV plug 87 and two AP stops 85. Also included is a 5 ohm resistor 88 to electrically replace the EPC solenoid as seen by the PCM, so no trouble codes are produced. The PCS plug is fashioned to be a cylinder 0.804 inches in diameter and 1.55 inches long, with a groove 89, shown in FIG. 9, set from one end 0.39 inches, which groove is 0.12 inches wide and 0.14 inches deep. Looking to FIG. 10, the PMV plug is a cylinder 0.494 inches in diameter and 1.500 inches long. The AP stops are also cylinders 0.31 inch in diameter and 1.60 inches long. The plugs and stops may be conveniently machined in aluminum, or in any other sufficiently wear-resistant and hard material.

The springs may be dimensioned as follows. Springs 81 and 82 may be identical to the factory springs, if desired. Accumulator inner springs 73 may be fashioned from 0.052 inch wire with a 0.460 inch diameter and 2.275 inches long. Accumulator outer springs 74a may be made from 0.063 inch wire with a 0.632 inch diameter and 2.645 inches long. Alternate accumulator outer springs 74b can be made from 0.072 inch wire with a 0.660 inch diameter and 2.425 inches long. In any event, a kit may include a tuned set of accumulator springs for a transmission as modified by the kit, providing a predetermined shift performance. Likewise, accumulator stops or other accumulator components may be included in a kit for further accumulator shift performance if desired.

EXEMPLARY MODIFICATION PROCEDURE

Figure 12:
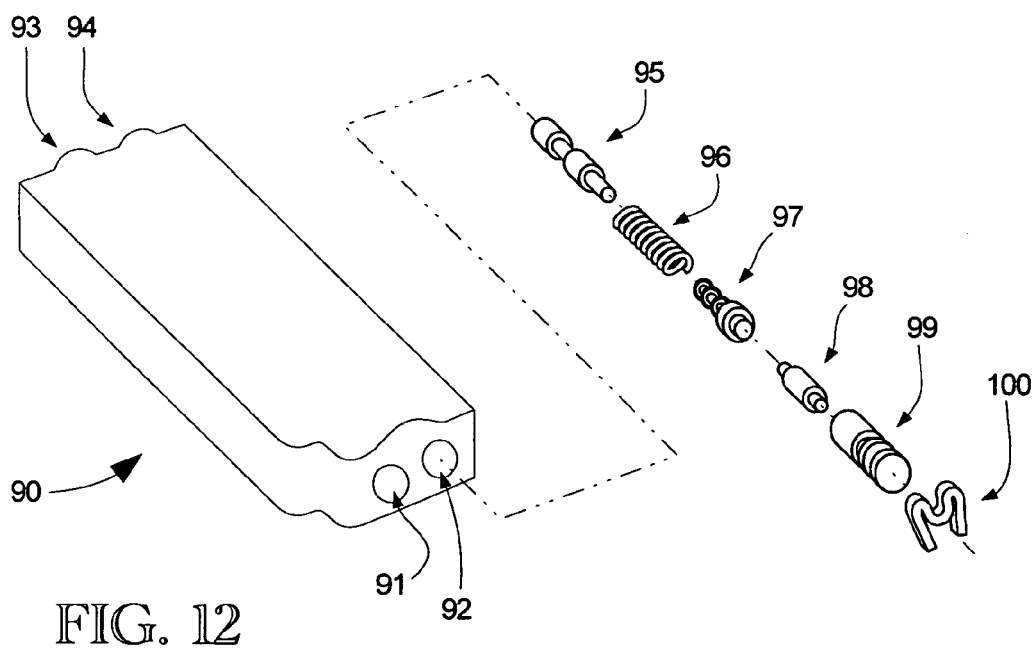
FIG. 12 shows an installation procedure to the line pressure modulator valve assembly using the kit of FIG. 8.

The installation procedure of the exemplary kit requires a partial disassembly of the transmission, the extent of which will be apparent to one of ordinary skill in the art. In the accumulator body 90, shown in FIG. 12, the line pressure modulator valve assembly is removed and discarded, including the line pressure modulator valve 95, outer spring 96, spring and retainer assembly 97, line pressure modulator plunger valve 98, and line pressure modulator sleeve 99. In the now empty line pressure modulator bore the PMV and PCS plugs are inserted, the PMV plug oriented grove first, followed by the PCS plug. Installing the PMV and PCS plugs renders the line pressure modulator inoperative by blocking potential fluid flow. The retainer 100 removed during removal of this valve assembly may be re-used to secure the plugs. Next, the 1-2 accumulator assembly is removed, replacing the factory springs with the kit-supplied springs as noted above. That assembly is re-inserted into bore 91. Next, in each of the 2-3 and 3-4 accumulators the factory inner and outer springs are replaced with the springs included in the kit, noted above. Within each of these accumulator assemblies, one of the AP stops is placed inside the springs to reduce the accumulator piston travel by approximately 0.20 inch. In each of these accumulator assemblies the factory control valve springs may be re-used if they are in good condition. After insertion into their respective bores 93 and 94, $\frac{1}{16}$ inch holes are drilled into the center of the end caps of all three accumulators to permit any fluid that may be deposited behind the pistons to be ejected into the pan.

Figure 13:
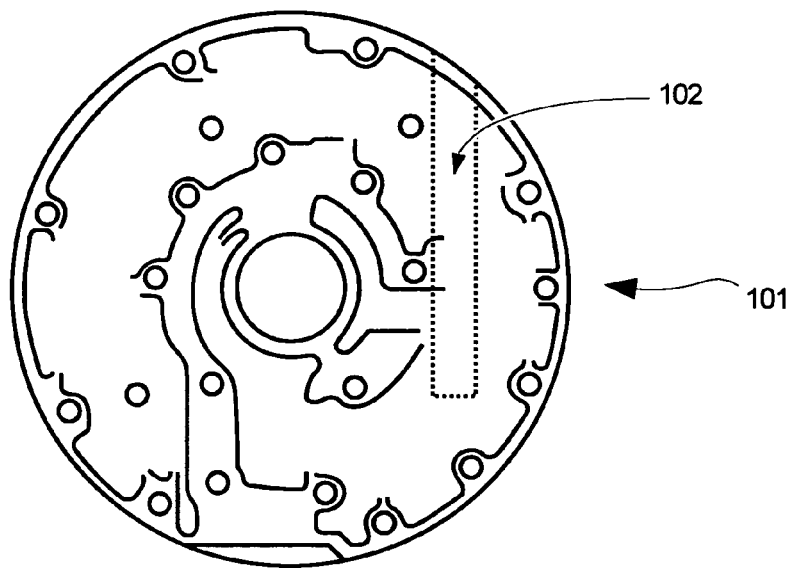
FIG. 13 shows an installation procedure to a pump cover using the kit of FIG. 8.
Figures 14, 15:
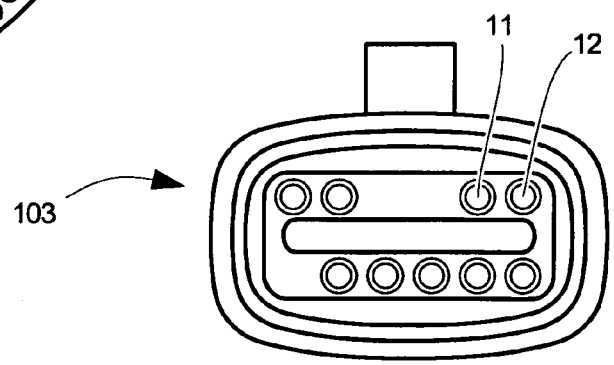
FIG. 14 shows an EPC Solenoid Case Connector of a Ford E40D/4R100 transmission.
FIG. 15 shows a Solenoid Assembly of a Ford E40D/4R100 transmission.

Next, in the pump housing 101, shown in FIG. 13, the main pressure regulator valve is removed from its bore 102 and the springs replaced. Note that this step is optional, and may be omitted if a full transmission rebuild is not undertaken. Next, the EPC solenoid is disconnected and resistor 78 is substituted as a load for the PCM. The EPC signals are delivered to pins 11 and 12, shown by the same numbers in FIG. 14, of the EPC solenoid case connector 103. The solenoid case connector mates to connector 105 of solenoid case 104, which case includes EPC solenoid at 106 shown in FIG. 15. One way to make this substitution is to unsolder both of the EPC solenoid terminals on the bottom of the EPC solenoid at the printed circuit board junction, and solder the resistor in its place across the terminals. The resistor may be secured by a wire tie or other fastener as desired.

Figure 16:
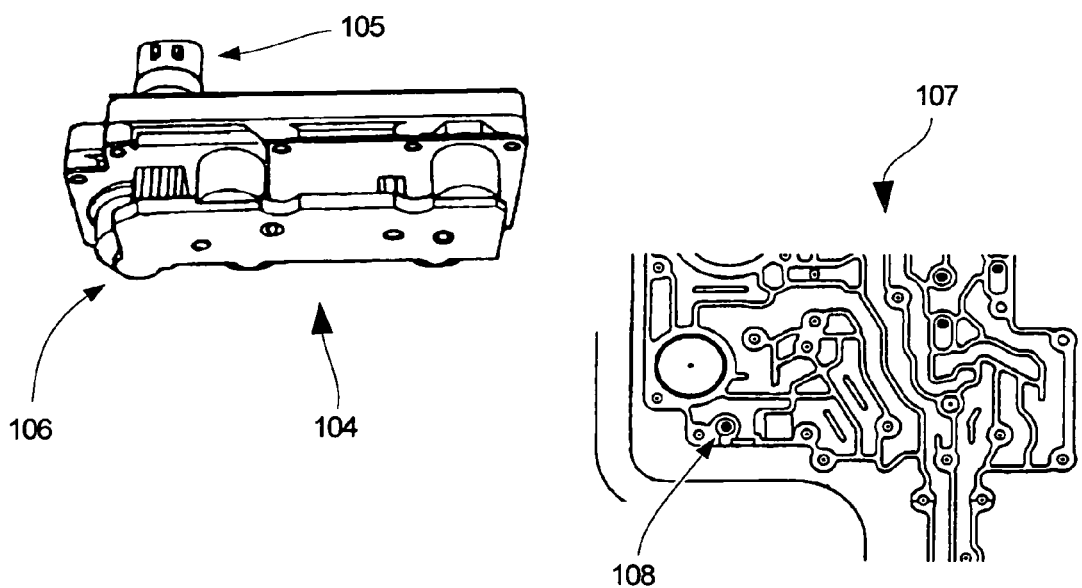
FIG. 16 depicts the location of the EPC check ball against the valve-body plate of a Ford E40D/4R100 transmission.

The final step is to replace the factory EPC check-ball with one of the three orificed check valves selected for the type of vehicle use. The location of the EPC exhaust port in relation to the valve-body plate is shown in FIG. 16, which is the installation location of the orificed check valve. The factory EPC spring may be re-used with the new orificed check valve. Now the above installation procedure need not be performed exactly, but rather any convenient order may be used.

The orificed check valves shown and described, and modification kits containing the same may be fashioned for other transmissions utilizing a positive displacement pump, including Ford models AXODE, AX4S, AX4N, 4F50N, 4R44E, 4R55E, 5R55E, 5R55N and 5R55W, General Motors models 4T65E, 4T40E, 4T45E, 4L60E, 4L65E, 4L80E, 4L80EHD and transmissions of other auto-makers, by following the principles and techniques described above.

Additionally, new transmissions may be manufactured to include a flow-controlled pressure modulation circuit, utilizing a check valve including an orifice or locating an orifice at another location in the circuit, with or without a computer-controlled pressure modulator. And while orificed check valves, kits for modifying a transmission to control line pressure and methods of using the same have been described and illustrated in conjunction with a number of specific configurations and methods, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

What is claimed:

1. A kit for modifying an automatic transmission, the transmission including an input shaft and a positive displacement pump providing fluid flow substantially proportional to the rotation of the input shaft, the transmission further including a reservoir of fluid accessible to the pump, the transmission further including a modulation circuit and a modulation pressure regulating solenoid controllable by an automotive computer, the transmission further including an exhaust port whereby excess fluid from the modulation circuit may be exhausted into the reservoir, said kit comprising: an orificed check valve including a spring fitting configured to receive a compression spring, said valve including a seating portion configured to provide a seal against the seat of the exhaust port of the modulation pressure circuit under condition of compression force applied to the spring fitting, said check valve further including a passage through said check valve forming an orifice, wherein said orifice includes an inlet positioned in said seating portion to receive pressure from fluid maintained in the modulation pressure circuit, further wherein said orifice includes an outlet whereby fluid passing through said orifice may be returned to the reservoir, and wherein the orifice has a sized opening sufficient to maintain a substantially linear relationship between fluid flow produced by the transmission pump and the pressure developed in the modulation pressure circuit such that higher pressures are delivered in the line circuit with increased fluid flow into the modulation pressure circuit and through said orifice; a substitutionary component for the modulation pressure regulating solenoid, said substitutionary component having similar characteristics to the regulating solenoid as sensed by the automotive computer.

2. A transmission modification kit according to claim 1, wherein the substitutionary component is an electrically resistive load having similar resistance to the modulation pressure regulating solenoid.

3. A transmission modification kit according to claim 1, further comprising at least one plug functional to disable a line modulator by insertion of said plug into the line modulator valve bore.

4. A transmission modification kit according to claim 1, further comprising a replacement set of accumulator springs tuned to accomplish a pre-determined shift performance in a transmission modified by the components comprising said kit.

5. A transmission modification kit according to claim 1, further comprising an accumulator stop functional to restrict the travel of an accumulator piston of the transmission to accomplish a pre-determined shift performance in a transmission modified by the components comprising said kit.

6. A transmission modification kit according to claim 1, further comprising an accumulator component, said accumulator component designed to be installed to an accumulator of the transmission to accomplish a pre-determined shift performance in a transmission modified by the components comprising said kit.

7. A transmission modification kit according to claim 1, further comprising replacement main pressure regulator springs.

8. A kit for modifying an automatic transmission, the transmission including an input shaft and a positive displacement pump providing fluid flow substantially proportional to the rotation of the input shaft, the transmission further including a reservoir of fluid accessible to the pump, the transmission further including a modulation circuit and a modulation pressure regulating solenoid controllable by an automotive computer, the transmission further including an exhaust port whereby excess fluid from the modulation circuit may be exhausted into the reservoir, the transmission further including a check ball sized to seal the exhaust port and a compression spring providing force against pressure in the modulation circuit, said kit comprising: an orificed check valve including a spring fitting configured to receive the compression spring, said valve including a seating portion having a rounded portion having a similar curvature to that of the check ball to provide a seal against the seat of the exhaust port of the modulation pressure circuit under condition of compression force applied to the spring fitting, said check valve further including a passage through said check valve forming an orifice, wherein said orifice includes an inlet positioned in said seating portion to receive pressure from fluid maintained in the modulation pressure circuit, further wherein said orifice includes an outlet whereby fluid passing through said orifice may be returned to the reservoir, and wherein the orifice has a sized opening sufficient to maintain a substantially linear relationship between fluid flow produced by the transmission pump and the pressure developed in the modulation pressure circuit such that higher pressures are delivered in the line circuit with increased fluid flow into the modulation pressure circuit and through said orifice; an electrically resistive load having similar electrical resistance to the pressure regulating solenoid substitutable for that solenoid as seen by the automotive computer sufficiently to avoid the setting of trouble codes by the computer.

9. A transmission modification kit according to claim 8, further comprising a plug assembly insertable into a line modulator valve bore and functional to substantially block flow through the line modulator.

10. A transmission modification kit according to claim 8, further comprising a replacement set of accumulator springs tuned to the line pressures produced by the inclusion of the components comprising said kit.

11. A transmission modification kit according to claim 8, further comprising an accumulator stop functional to restrict the travel of an accumulator piston of the transmission tuned to the line pressures produced by the inclusion of the components comprising said kit.

12. A method of modifying an automatic transmission to have line pressure controllable through input shaft rotation, wherein the transmission includes an input shaft and a positive displacement pump providing fluid flow substantially proportional to the rotation of the input shaft, wherein the transmission further includes a reservoir of fluid accessible to the pump, further wherein the transmission includes a modulation circuit and a modulation pressure regulating solenoid controllable by an automotive computer, wherein the transmission further includes an exhaust port whereby excess fluid from the modulation circuit may be exhausted into the reservoir, wherein the transmission further includes a check ball sized to seal the exhaust port and a compression spring providing force against pressure in the modulation circuit, said method comprising the steps of: replacing the check ball with an orificed check valve including a spring fitting configured to receive a compression spring, a seating portion configured to provide a seal against the seat of the exhaust port of the modulation pressure circuit under condition of compression force applied to the spring fitting, a passage through said check valve forming an orifice, wherein said orifice includes an inlet positioned in said seating portion to receive pressure from fluid maintained in the modulation pressure circuit, further wherein said orifice includes an outlet whereby fluid passing through said orifice may be returned to the reservoir, and wherein the orifice has a sized opening sufficient to maintain a substantially linear relationship between fluid flow produced by the transmission pump and the pressure developed in the modulation pressure circuit such that higher pressures are delivered in the line circuit with increased fluid flow into the modulation pressure circuit and through said orifice; disabling or disconnecting the pressure regulating solenoid; and substituting a load electrically similar to the pressure regulating solenoid to the automotive computer.

13. A method according to claim 12, wherein the transmission further includes a line modulator receiving as input pressure from the modulation circuit and fluid under line pressure, the line modulator further transmitting fluid to at least one servo modulated by the input pressure, said method further comprising the step of replacing the line modulator valve with a plug that blocks passage of fluid under line pressure to the output.

14. A method according to claim 12, wherein the transmission includes at least one accumulator, the method further comprising the step of replacing the accumulator springs in one accumulator with springs configured for pressures presented by the substitution of the orificed check valve and the disablement of the pressure regulating solenoid.

15. A method according to claim 12, wherein the transmission includes at least one accumulator, further comprising inserting stops in one of the accumulators thereby restricting the travel of the accumulator piston in that accumulator and further adapting the accumulator for pressures presented by the substitution of the orificed check valve and the disablement of the pressure regulating solenoid.

* * * * *